United States Patent [19]

Neri

[11] Patent Number: 4,813,659
[45] Date of Patent: Mar. 21, 1989

[54] SYSTEM FOR FEEDING STACKS OF SHEET MATERIAL ON TO A USER MACHINE

[75] Inventor: Armando Neri, Bologna, Italy

[73] Assignee: G.D Società Per Azioni, Bologna, Italy

[21] Appl. No.: 178,199

[22] Filed: Apr. 6, 1988

[30] Foreign Application Priority Data

Apr. 15, 1987 [IT] Italy ................... 3432 A/87

[51] Int. Cl.⁴ .............................................. B65H 5/00
[52] U.S. Cl. ....................................... 271/10; 271/306
[58] Field of Search ................ 271/1, 3, 3.1, 4, 10-17, 271/264, 306; 131/84.1, 84.2, 84.3, 58, 60, 906, 907, 281, 212-224; 53/234, 148, 64, 54, 389; 414/225

[56] References Cited

U.S. PATENT DOCUMENTS

| | | | |
|---|---|---|---|
| 4,132,398 | 1/1979 | Erdmann et al. | 271/12 X |
| 4,165,811 | 8/1979 | Mainvielle | 271/18.3 X |
| 4,253,906 | 3/1981 | Boogers | 271/4 X |
| 4,359,216 | 11/1982 | Leonard | 271/107 |
| 4,667,831 | 5/1987 | Mattei et al. | 131/907 X |
| 4,688,583 | 8/1987 | Neri | 131/906 X |
| 4,696,311 | 9/1987 | Chard et al. | 131/84.1 X |
| 4,697,603 | 10/1987 | Steinhauer et al. | 131/84.1 X |
| 4,727,888 | 3/1988 | Luke | 131/84.1 |
| 4,764,078 | 8/1988 | Neri | 414/225 X |

Primary Examiner—Douglas C. Butler
Attorney, Agent, or Firm—Marshall, O'Toole, Gerstein, Murray & Bicknell

[57] ABSTRACT

A system for automatically feeding stacks of blanks on to the input conveyor of a hard-pack cigarette packing machine whereby a transfer cage designed to receive the stack is moved to and from a surface supporting a number of stacks and between the supporting surface and the input conveyor by optical control elements designed to detect the position of each stack on the supporting surface, the aforementioned cage being defined by rods, each designed to engage a respective hole formed through the supporting surface and each fitted with a respective engaging element designed to move inside the respective hole in such a manner as to fit beneath the base of the respective stack.

9 Claims, 3 Drawing Sheets

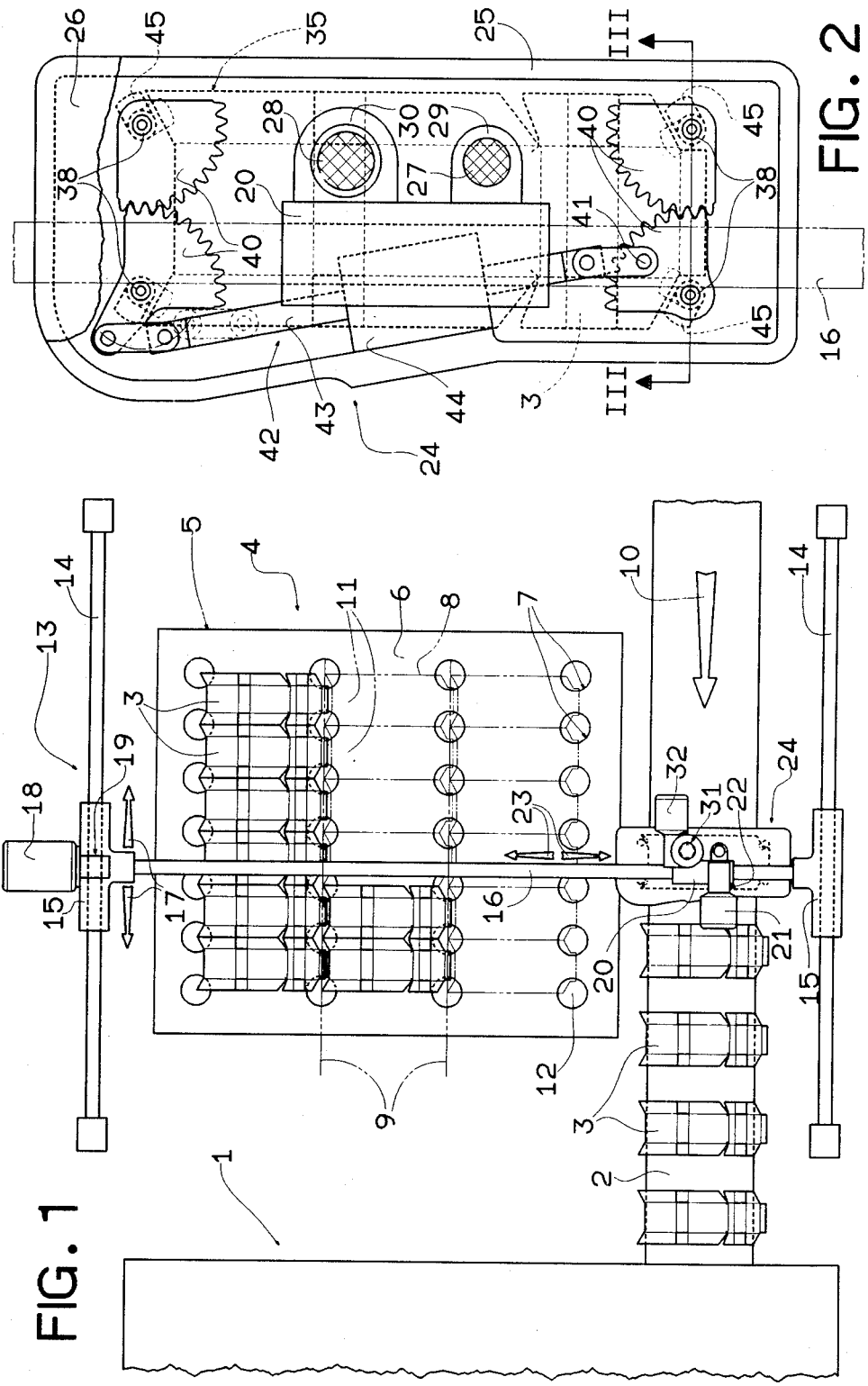

4,813,659

SYSTEM FOR FEEDING STACKS OF SHEET MATERIAL ON TO A USER MACHINE

BACKGROUND OF THE INVENTION

The present invention relates to a system for feeding stacks of sheet material on to a user machine, in particular a cigarette packing machine.

The system according to the present invention is particularly suitable for feeding stacks of cardboard blanks from which to form cigarette packs.

Hard-pack cigarette packing machines are known to be fed with stacks of blanks loaded manually on to an input conveyor belt which, as it jogs forward, supplies single stacks to transfer means designed to transfer single blanks on to the packing line on the machine.

SUMMARY OF THE INVENTION

The aim of the present invention is to provide a system enabling stacks of blanks to be fed fully automatically on to the input conveyor of a packing machine.

With this aim in view, according to the present invention, there is provided a system for feeding stacks of sheet material, in particular blanks from which to form cigarette packs, on to a user machine having an input conveyor, characterised by the fact that it comprises a storage element for storing the said stacks and defining a supporting surface for the said stacks arranged side by side; and a unit for successively withdrawing the said stacks from the said supporting surface and transferring the same on to the said input conveyor; the said withdrawal and transfer unit comprising a cage designed to house one said stack, the said cage being positionable facing the said supporting surface and having an open end facing the same; engaging means carried on the said cage and designed to move between an open position and a position at least partially closing the said open end; means for detecting the position of each said stack in relation to the said input conveyor; actuating means, controlled by the said detecting means, for moving the said cage between each said stack on the said supporting surface and the said input conveyor; and second actuating means for moving the said engaging means between the said open and closed positions.

BRIEF DESCRIPTION OF THE DRAWINGS

The present invention will be described, by way of a non-limiting example, with reference to the accompanying drawings, in which:

FIG. 1 shows a schematic view of a cigarette packing machine featuring the blank feeding system according to the present invention;

FIG. 2 shows a larger-scale, partially-sectioned view of a detail in FIG. 1;

DETAILED DESCRIPTION OF THE INVENTION

Figure 3:
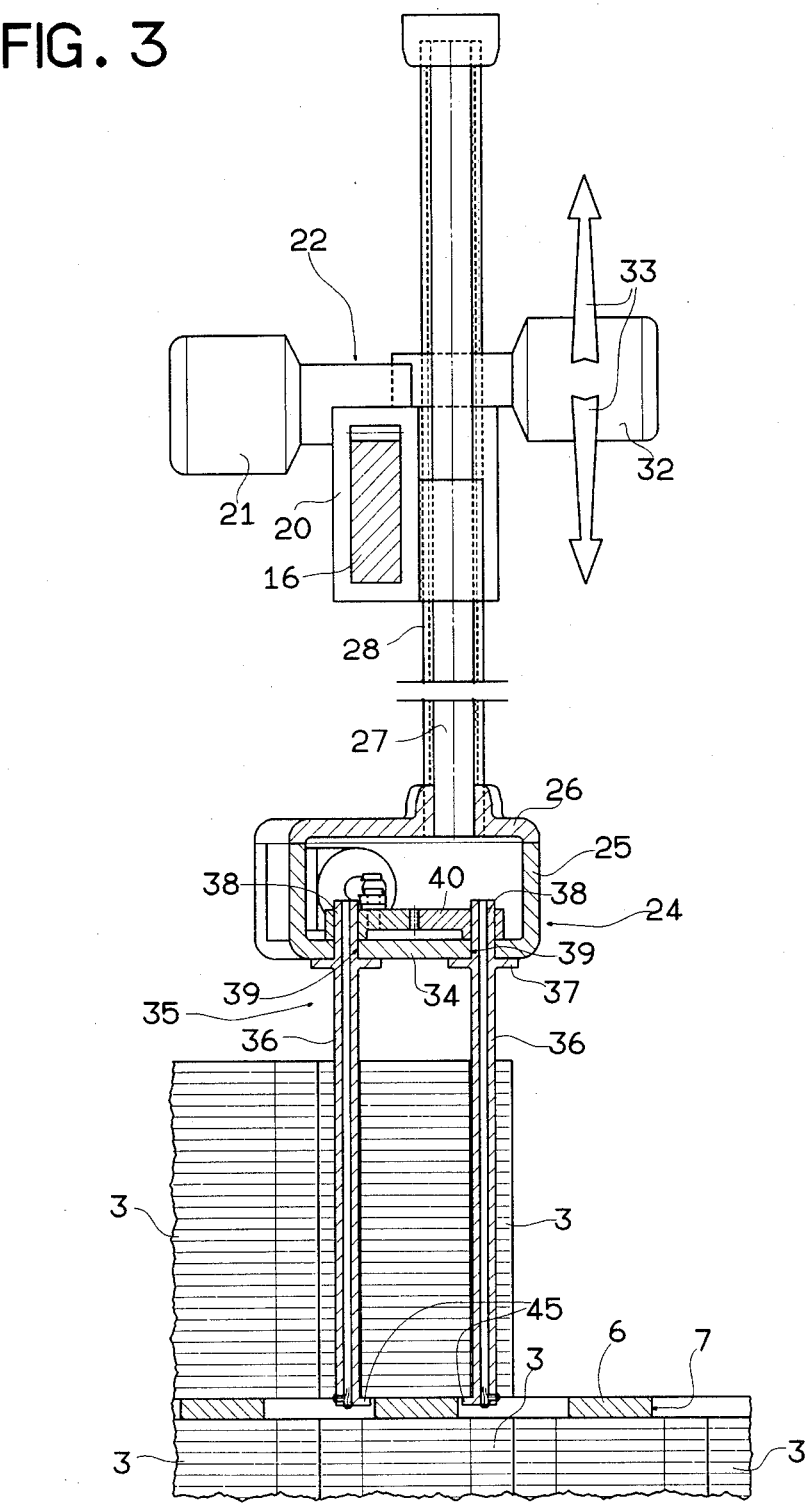
FIG. 3 shows a section of a detail in FIG. 1.

With reference to FIG. 1, number 1 indicates a cigarette packing machine, and number 2 an input conveyor belt for feeding stacks 3 of cardboard blanks to packing members (not shown) on the said machine 2.

The said stacks 3 are fed successively on to conveyor 2 by means of a system indicated as a whole by 4 and comprising a store 5 located to the side of conveyor 2. The said store 5 presents a top supporting surface defined by a flat plate 6 parallel with the surface of conveyor 2 and on which the said stacks 3 are arranged in a predetermined manner as defined by a number of through holes 7 formed through the said plate 6.

In more detail and as shown in FIG. 1, the said holes 7 on plate 6 are formed at the intersections of a number of lines 8 and 9 respectively perpendicular to and parallel with arrow 10 indicating the traveling direction of conveyor 2, so as to define the tips of a number of rectangles 11 having their resepective longer axes perpendicular to arrow 10. Stacks 3 are arranged on plate 6 in such a manner that the base of each stack 3 occupies a respective rectangle 11, and are brought together in the direction of lines 8 so that, when rectangles 11 are all occupied by respective stacks 3, each hole 7 presents an exposed intermediate portion 12 accessible from above, whereas the remainder of hole 7 is occupied by edge portions of adjacent stacks 3.

Stacks 3 are fed on to conveyor 2 by means of a transfer unit 13 comprising, as shown in FIG. 1, two rails 14 parallel with arrow 10 and located over and on either side of the assembly consisting of store 5 and conveyor 2. The said rails 14 support, in sliding manner, respective slides 15 connected by a crosspiece 16, which is moved back and forth, as shown by arrows 17 parallel with arrow 10, over the said store 5 and conveyor 2 via actuating means consisting of a step motor 18 carried on one of the said slides 15 and connected to the respective rail 14 by means of a rack and pinion coupling 19.

On the said crosspice 16, there is mounted, in sliding manner, a further slide 20 supporting an actuating means consisting of motor 21. The said motor 21 is connected to crosspiece 16 by means of a rack and pinion coupling 22, for moving the said slide 20 back and forth along crosspiece 16, as shown by arrows 23 perpendicular to arrow 10.

As shown in FIGS. 2 and 3, beneath the said slide 20 there is suspended a transfer head indicated as a whole by 24 and comprising a substantially parallelepiped box 25, from the top wall 26 of which there extend upwards two parallel rods 27 and 28, the bottom ends of which are integral with wall 26, and the top portions of which engage, in sliding manner, respective vertical bushes 29 and 30 carried on slide 20. Rod 27 acts as an antirotation guide, and rod 28 as a drive rod connected by a rack and pinion coupling 31 to the output of an actuating means consisting of motor 32 on slide 20, for moving head 24 up and down vertically as shown by arrows 33 (FIG. 3).

From the bottom wall 34 of box 25, there extends vertically downwards a pick-up cage 35 designed to receive a stack 3 and defined by four tubular rods 36, each having a top flange 37 mating with the outer surface of wall 34. Over respective flange 37, each rod 36 presents an end portion 38 engaging, in rotary manner, a respective hole 39 formed through wall 34, and fitted, inside box 25, with a sector gear 40.

As shown in FIG. 2, rods 36 are substantially arranged in the form of a rectangular parallelepipedon, the base of which is substantially the same as one of rectangles 11, and the sector gears 40 fitted on each pair of rods 36 along the shorter sides of the said rectangle mesh so that, when activated, the respective said two rods 36 are rotated in opposite directions. One of each said pair of meshing sector gears 40 is connected, via a respective eccentric pin 41, to a respective end of a drive 42, the intermediate portion of which, extending substantially parallel with crosspiece 16, consists of a straight rod 43, the intermediate portion of which extends through an actuating means consisting of control motor 44 having a hollow shaft connected to rod 43 by a screw-nut screw coupling (not shown).

The bottom end of each rod 36 is connected integral with an engaging means consisting of a radial arm 45 which, subsequent to rotation of rod 36 by motor 44 via respective sector gear 40, moves through approximately 90° about the axis of respective rod 36, between a first idle position, wherein the said arm 45 is allowed to engage the exposed portion 12 of respective hole 7, and a pick-up position wherein arm 45 is allowed to interfere with a respective stack 3.

Figure 4:
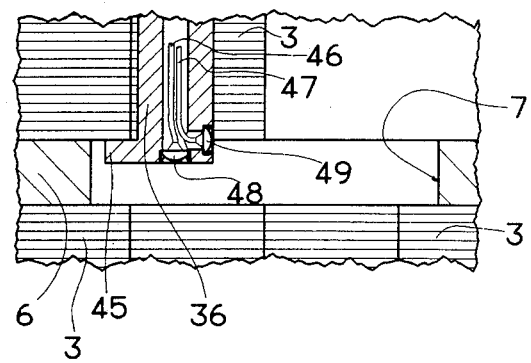
FIG. 4 shows a larger-scale view of a detail in FIG. 3.

As shown in FIG. 4, inside at least one of the said tubular rods 36, there extend two fiber bundles 46 and 47, the respective bottom ends of which are connected to respective detecting means consisting of optical sensors 48 and 49 positioned respectively in line with and perpendicular to the axis of respective rod 36. In more detail, the said sensor 49 is housed inside a radial through hole having its axis coplanar with the upper surface of respective arm 45.

Operation of transfer unit 13 is controlled by a known type of automatic control unit (not shown) available on the market and usually employed on three-axis dimensional control equipment.

In its initial idle position, transfer unit 13 is arranged as shown in FIG. 1, with its rods 28 in the fully-raised position supporting cage 35 at a higher level than stacks 3 on conveyor 2 and inside store 5.

It should be pointed out that store 5 may comprise either a single plate 6 supporting a number of stacks 3, or a number of superimposed plates 6, each supporting a respective number of stacks 3.

When a plate 6 is placed inside store 5 with its stacks 3 in the withdrawal position, transfer unit 13 first determines the precise position of the said plate 6. For this purpose, motors 18 and 21 are activated so as to cause one of optical sensors 48 to successively determine the horizontal location of two perpendicular edges of plate 6. As the dimensions of plates 6 are standard and known to the said control unit (not shown), the horizontal location of plate 6 is thus unequivocally defined. Head 24 is then moved laterally outwards of plate 6, and motor 32 activated so as to lower cage 35 and determine, via one of sensors 49, the level at which plate 6 is located. The location of plate 6 in relation to conveyor 2 is thus fully defined and memorised by the said control unit (not shown).

Figure 5:
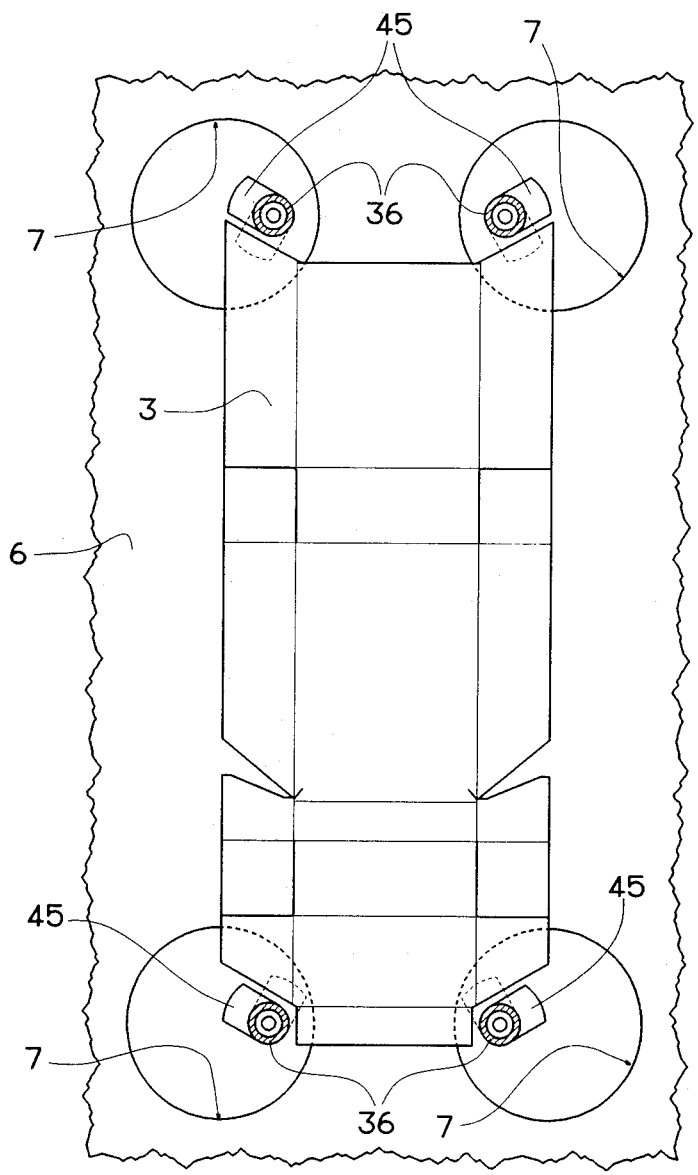
FIG. 5 shows a larger-scale view of a detail in FIG. 1.

For transferring a new stack 3 from plate 6 on to conveyor 2, transfer unit 13 is activated so as to move head 24 from the idle position over conveyor 2 to a detecting position over plate 6. Via two successive detecting functions similar to those for determining the horizontal location of plate 6, such displacement of head 24 provides for determining the exact horizontal location of a first stack 3 for withdrawal. Head 24 is then moved by the said control unit (not shown) over the said detected stack 3, with rods 36 and respective radial arms 45 in the position shown by the continuous line in FIG. 5. At this point, motor 32 is activated so as to lower cage 35 and cause arms 45 to engage the exposed portions 12 of holes 7 at the corners of the selected stack 3. Motor 44 is then activated so as to turn rods 36 and respective arms 45 into the position shown by the dotted line in FIG. 5, wherein arms 45 engage the underside of stack 3, after which, motors 32, 21 and 18 are activated successively for raising head 24 to a higher level than the remaining stacks 3 on plate 6, and then moving it into position over conveyor 2. Motors 32 and 44 are then activated successively for feeding and releasing the withdrawn stack 3 on to conveyor 2, after which, motor 32 is again activated for returning head 24 to the raised idle position.

A counter (not shown) on packing machine 1 and connected to the said control unit (not shown) provides for repeating the above procedure as the stacks 3 on conveyor 2 are gradually used up.

I claim:

1. A system for feeding stacks of sheet material, in particular blanks from which to form cigarette packs, on to a user machine having an input conveyor, characterised by the fact that it comprises a storage element (5) for storing the said stacks (3) and defining a supporting surface (6) for the stacks (3) arranged side by side; and a unit (13) for successively withdrawing the said stacks (3) from the said supporting surface (6) and transferring the same on to the said input conveyor (2); the said withdrawal and transfer unit (13) comprising a cage (35) designed to house one said stack (3), the said cage (35) being positionable facing the said supporting surface (6) and having an open end facing the same; engaging means (45) carried on the said cage (35) and designed to move between an open position and a position at least partially closing the said open end; means (48, 49) for detecting the position of each said stack (3) in relation to the said input conveyor (2); actuating means (18, 21, 32), controlled by the said detecting means (48, 49), for moving the said cage (35) between each said stack (3) on the said supporting surface (6) and the said input conveyor (2); and second actuating means (44) for moving the said engaging means (45) between the said open and closed positions.

2. A system as claimed in claim 1, characterised by the fact that the said actuating means comprise first actuating means (18, 21) for moving the said cage (35) parallel with the said supporting surface (6); and second actuating means (32) for moving the said cage (35) perpendicularly to the said supporting surface (6).

3. A system as claimed in claim 1, characterised by the fact that the said cage (35) is supported on a head (24) and comprises a number of rods (36) extending from the said head (24) and perpendicularly towards the said supporting surface (6); the said engaging means (45) being carried on the free ends of the said rods (36).

4. A system as claimed in claim 3, characterised by the fact that the said supporting surface (6) presents a number of through holes (7), each arranged in such a manner as to project partially outwards of the bottom end of a respective said stack (3) on the said supporting surface (6); each said rod (36) being alignable with the said projecting portion of each said hole (7); and the said hole (7) being engageable by the free end of a respective said rod (36) and by the respective said engaging means (45).

5. A system as claimed in claim 4, characterised by the fact that the said engaging means comprise, for each said rod (36), an arm (45) extending radially outwards from the free end of the said rod (36) and connected to the said second actuating means (44) in such a manner as to turn about the axis of the said rod (36).

6. A system as claimed in claim 5, characterised by the fact that each said arm (45) is integral with the respective said rod (36); each said rod (36) being mounted on the said head (24) in such a manner as to turn in relation to the same about its own axis; and the said second actuating means (44) being carried on the said head (24) and being connected to each said rod (36).

7. A system as claimed in claim 3,
characterised by the fact that the said detecting means (48, 49) are carried on at least one of the said rods (36).

8. A system as claimed in claim 7, characterised by the fact that the said detecting means comprise a first optical sensor (48) carried on and arranged axially in relation to the said rod (36); each said first optical sensor (48) being designed to detect the location of each said stack (3) on the said supporting surface (6).

9. A system as claimed in claim 4,
characterised by the fact that, for at least one of the said rods (36), the said detecting means also comprise a second optical sensor (49) carried on and arranged radially in relation to the said rod (36); the said second optical sensor (49) being designed to detect, in use, the position of the said supporting surface (6) and to control, in use, the said second actuating means (44) for moving the said engaging means (45) into a position wherein they engage the underside of the respective said stack (3).

* * * * *